US008493920B2

(12) United States Patent
Park et al.

(10) Patent No.: US 8,493,920 B2
(45) Date of Patent: Jul. 23, 2013

(54) METHOD FOR TRANSMITTING VOICE PACKETS IN WIRELESS COMMUNICATION SYSTEM

(75) Inventors: Sung June Park, Anyang-si (KR); Young Dae Lee, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 502 days.

(21) Appl. No.: 12/311,569

(22) PCT Filed: Sep. 27, 2007

(86) PCT No.: PCT/KR2007/004697
§ 371 (c)(1),
(2), (4) Date: Apr. 3, 2009

(87) PCT Pub. No.: WO2008/041805
PCT Pub. Date: Apr. 10, 2008

(65) Prior Publication Data
US 2009/0274107 A1    Nov. 5, 2009

Related U.S. Application Data

(60) Provisional application No. 60/828,310, filed on Oct. 5, 2006.

(30) Foreign Application Priority Data

Aug. 31, 2007    (KR) .......................... 10-2007-0088628

(51) Int. Cl.
*H04W 4/00* (2009.01)
*H04W 72/00* (2009.01)
*H04B 7/212* (2006.01)

(52) U.S. Cl.
USPC ............ 370/329; 370/348; 455/450; 455/451

(58) Field of Classification Search
USPC .. 370/322, 329, 345, 348, 458, 459; 714/748; 455/450–452.2, 464.5, 511
See application file for complete search history.

(56) References Cited

U.S. PATENT DOCUMENTS

| 6,782,361 | B1 | 8/2004 | El-Maleh et al. |
| 7,027,989 | B1 | 4/2006 | Tapadar et al. |
| 2006/0056383 | A1* | 3/2006 | Black et al. .................... 370/350 |
| 2006/0234716 | A1* | 10/2006 | Vesterinen et al. ........... 455/450 |
| 2007/0025391 | A1* | 2/2007 | Yonge et al. .................. 370/458 |
| 2007/0047547 | A1* | 3/2007 | Conner et al. ................. 370/392 |
| 2007/0098016 | A1* | 5/2007 | Kapoor et al. ................ 370/474 |
| 2007/0189205 | A1* | 8/2007 | Terry et al. .................... 370/328 |
| 2007/0245201 | A1* | 10/2007 | Sammour et al. ............. 714/748 |
| 2008/0031253 | A1* | 2/2008 | Kim et al. ..................... 370/393 |
| 2010/0220693 | A1* | 9/2010 | Ho ................................ 370/336 |

FOREIGN PATENT DOCUMENTS

WO    WO 2006/115391    11/2006

* cited by examiner

*Primary Examiner* — Awet Haile
(74) *Attorney, Agent, or Firm* — McKenna, Long & Aldridge, LLP.

(57) ABSTRACT

There is provided a method for transmitting voice packets for VoIP service using semi-persistent scheduling that previously allocates radio resources and performs uplink transmission using the previously allocated radio resources when additional radio resource allocation is not allocated. The method includes allocating radio resources used for talkspurt and radio resources used for silent period, detecting transition from the talkspurt to the silent period or transition from the silent period to the talkspurt, and transmitting a transition indicator that indicates the transition from the talkspurt to the silent period or transition from the silent period to the talkspurt.

8 Claims, 4 Drawing Sheets

▨ Transition Indicator
▦ Resources for Transition Indicator

METHOD FOR TRANSMITTING VOICE PACKETS IN WIRELESS COMMUNICATION SYSTEM

This application claims the benefit of PCT/KR2007/004697 filed on Sep. 27, 2007, U.S. Provisional application No. 60/828,310 filed on Oct. 5, 2006, and Korean Patent Application No. 10-2007-0088628 filed on Aug. 31, 2007, the contents of which are hereby incorporated herein by reference for all purposes in their entirety.

TECHNICAL FIELD

The present invention relates to wireless communication, and more particularly, to a method for transmitting voice packets in a wireless communication system.

BACKGROUND ART

Third generation partnership project (3GPP) mobile communication systems based on a wideband code division multiple access (WCDMA) radio access technique are widely deployed all over the world. High speed downlink packet access (HSDPA) that can be defined as a first evolutionary stage of WCDMA provides 3GPP with highly competitive radio access technique in the mid-term future. However, since requirements and expectations of users and service providers are continuously increased and developments of competing radio access techniques are continuously in progress, new technical evolutions in 3GPP are required to secure competitiveness in the future. Decrease of cost per bit, increase in service availability, flexible use of frequency bands, simple architecture and open interface, low power consumption of a user equipment and the like are suggested as requirements of next generation communication systems.

Voice over IP (VoIP) is a service that transmits voice data through Internet protocol (IP) and provides voice data over packet switched (PS) domain instead of circuit switched (CS) domain conventionally. The VoIP service transmits connection-less voice data whereas CS based voice service transmits end-to-end voice data, and thus VoIP can use network resources with high efficiency.

With the development of wireless communication techniques, the quantity of user data is increasing very rapidly and PS based service are substituting CS based service for efficient utilization of limited network resources. VoIP is developed in view of this trend and it is expected that most wireless communication systems provide voice services through VoIP.

It is disadvantageous that VoIP has quality of service (QoS) lower than that of the CS based voice service. Typical factors that affect QoS include delay, jitter and a high frame error rate (FER). Although VoIP in the initial developing stage has QoS poorer than the CS based voice service, current VoIP guarantees QoS almost equivalent to the CS base voice service in wired communication.

To effectively provide the PS base voice service, real-time transport protocol (RTP) has been developed, and RTP control protocol (RTCP) for controlling RTP has been also developed. The RTP includes time stamp information in every packet so that a jitter problem can be solved. Furthermore, FER can be reduced through rate control by reporting a loss of RTP packet through the RTCP. A session initiation protocol (SIP) and a session description protocol (SDP) have been developed in addition to RTP/RTCP to maintain end-to-end virtual connection to solve a delay problem.

Though VoIP in wired communication can guarantee satisfactory QoS, VoIP in wireless communication still has QoS considerably poorer than the CS based voice service. Robust header compression (ROHC), which is an improved header compression technique, has been developed and used in order to improve transmission efficiency of VoIP. However, the overall QoS is still lower than that of the CS based voice service.

QoS may be considerably deteriorated when the RTP and RTCP are provided as a single stream because packet properties of RTP and RTCP are different from each other. This is one of the most serious problems to support VoIP in a wireless communication system. The RTP is insensitive to error rate but sensitive to delay and jitter because it is real-time user data whereas the RTCP corresponding to control data is insensitive to delay and jitter but sensitive to error rate. Furthermore, while the RTP carries voice data so that small-size packets are frequently transmitted, the RTCP has large transmission capacity and a low transmission frequency compared to the RTP. The RTCP is irregularly transmitted because it is control data.

A technique for guaranteeing QoS of voice packets is required in order to achieve an efficient VoIP service in a wireless communication system.

DISCLOSURE OF INVENTION

Technical Problem

An object of the present invention is to provide a method for transmitting voice packets, which reduces waste of radio resources used to transmit the voice packets using transition information according to change of a voice packet pattern.

Technical Solution

In one aspect, there is provided a method for transmitting voice packets for VoIP service using semi-persistent scheduling that previously allocates radio resources and performs uplink transmission using the previously allocated radio resources when additional radio resource allocation is not allocated. The method includes allocating radio resources used for talkspurt and radio resources used for silent period, detecting transition from the talkspurt to the silent period or transition from the silent period to the talkspurt, and transmitting a transition indicator that indicates the transition from the talkspurt to the silent period or transition from the silent period to the talkspurt.

In another aspect, there is provided a method for transmitting voice packets for VoIP service. The method includes configuring a radio bearer (RB) including information on allocation of radio resources used to transmit a transition indicator, detecting transition from talkspurt to silent period or transition from the silent period to the talkspurt, and transmitting the transition indicator including the detection result through the radio resources, wherein the voice packets are transmitted using different radio resources in the talkspurt and the silent period according to the transition indicator.

Advantageous Effects

Radio resources required to transmit voice packets through VoIP can be reduced. Generation of unnecessary control signals can be decreased when the present invention is used together with semi-persistent scheduling. Consequently, system performance can be improved.

MODE FOR THE INVENTION

Figure 1:
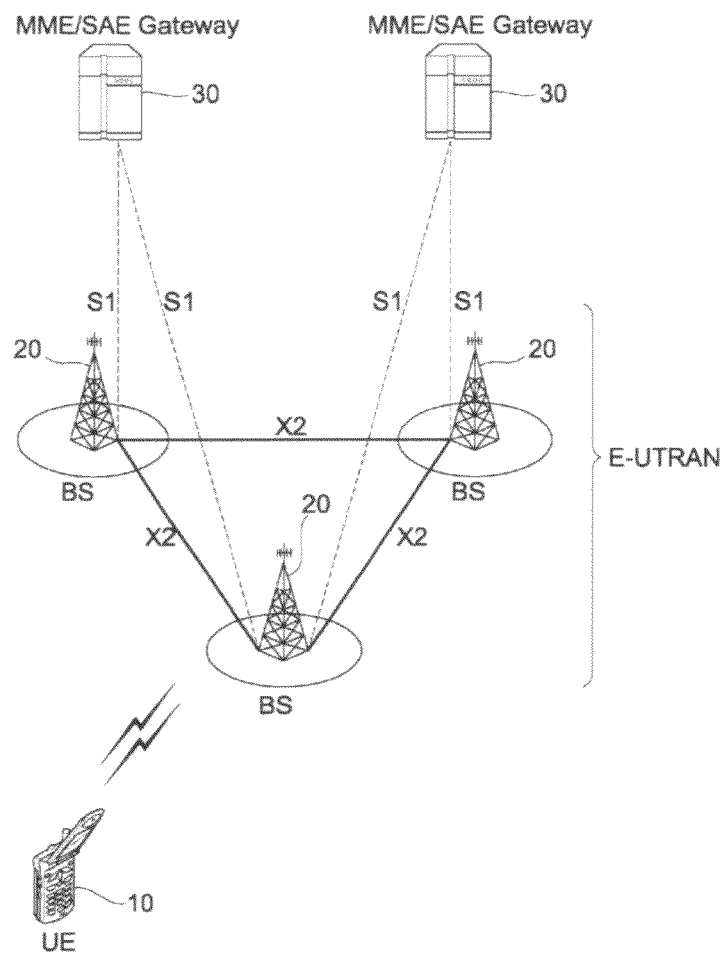
FIG. 1 is a block diagram showing a wireless communication system.

FIG. 1 is a block diagram showing a wireless communication system. This may be the network architecture of an evolved-universal mobile telecommunications system (E-UMTS). The E-UMTS may be referred to as a long term evolution (LTE) system. The wireless communication system is widely deployed to provide a variety of communication services such as audio data, packet data, or the like.

Referring to FIG. 1, evolved-UMTS terrestrial radio access network (E-UTRAN) includes a base station (BS) 20 for providing control plane and user plane.

A user equipment (UE) 10 can be fixed or mobile and can be referred to as other terminologies such as a mobile station (MS), user terminal (UT), subscriber station (SS), wireless device, or the like. The base station 20 generally means a fixed station that communicates with the user equipment 10 and can be referred to as other terminologies such as an evolved-Node B (eNB), base transceiver system (BTS), access point, or the like. The base station 20 can serve for at least one cell. An interface for transmitting user traffics or control traffics can be used between base stations 20. Hereinafter, downlink means communication from the base station 20 to the user equipment 10, and uplink means communication from the user equipment 10 to the base station 20.

The base stations 20 can be interconnected with each other by means of an X2 interface. The base station 20 is connected to evolved packet core (EPC), more specifically to a mobility management entity/system architecture evolution (SAE/MME) gateway 30, through an S1 interface. The S1 interface supports a many-to-many relation between the base station 20 and the MME/SAE gateway 30.

Figure 2:
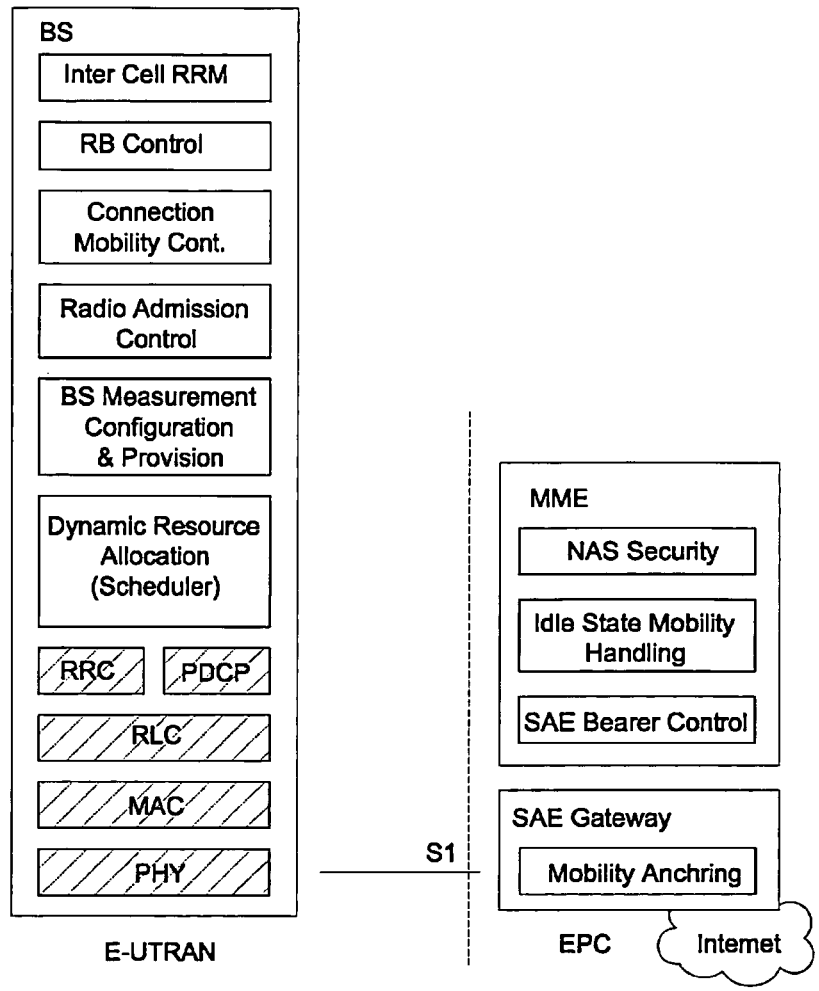
FIG. 2 is a block diagram showing a functional split between evolved universal terrestrial radio access network (E-UTRAN) and evolved packet core (EPC).

FIG. 2 is a block diagram showing a functional split between E-UTRAN and EPC.

Referring to FIG. 2, slant lined blocks represent radio protocol layers, and other blocks show functional entities of the control plane.

The base station hosts following functions: (1) functions for radio resource management such as a radio bearer control, radio admission control, connection mobility control and dynamic allocation of resources to user equipments in both uplink and downlink (scheduling), (2) Internet protocol (IP) header compression and encryption of user data streams, (3) routing of user plane data towards an SAE gateway, (4) scheduling and transmission of paging messages, (5) scheduling and transmission of broadcast information and (6) measurement and measurement reporting configuration for mobility and scheduling.

The MME hosts following functions: (1) distribution of paging messages to the base stations, (2) security control, (3) idle state mobility control, (4) SAE bearer control and (5) ciphering and integrity protection of non-access stratum (NAS) signaling.

The SAE gateway hosts following functions: (1) termination of user plane packets for paging reasons and (2) switching of user plane for support of user equipment mobility.

Layers of the radio interface protocol between the user equipment and the base station can be classified into L1 (a first layer), L2 (a second layer), and L3 (a third layer) based on the lower three layers of the open system interconnection (OSI) model that is well-known to communication systems. The physical layer belonging to the first layer provides an information transfer service using a physical channel. A radio resource control (RCC) layer belonging to the third layer serves to control radio resources between the user equipment and the network. The UE and the network exchange RRC messages via the RRC layer.

Figure 3:
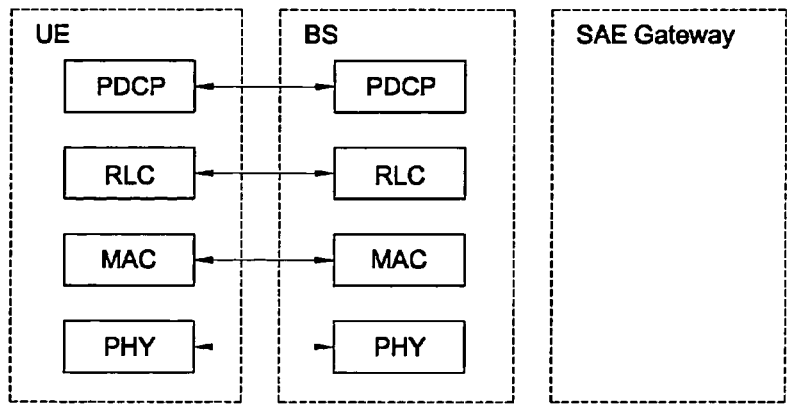
FIG. 3 is a block diagram showing the radio protocol architecture of a user plane.
Figure 4:
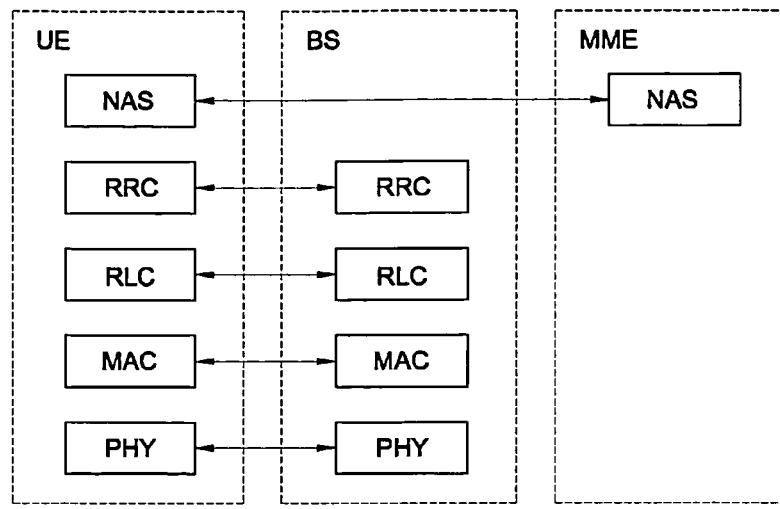
FIG. 4 is a block diagram showing the radio protocol architecture of a control plane.

FIG. 3 is a block diagram showing the radio protocol architecture of a user plane, and FIG. 4 is a block diagram showing the radio protocol architecture of a control plane. These show the architectures of the radio interface protocol between the user equipment and the E-UTRAN. The data plane is a protocol stack for transmitting traffic data, and the control plane is a protocol stack for transmitting control signals.

Referring to FIGS. 3 and 4, a physical layer provides an information transfer service to an upper layer using a physical channel. The physical layer is connected to the medium access control (MAC) layer through a transport channel, and data are transferred between the MAC layer and the physical layer via a transport channel. Data moves between the MAC layer and the physical layer via the transport channel. Data moves between different physical layers, that is, a physical layer for a transmitter and a physical layer for a receiver, via the physical channel. The physical layer can modulate data in the orthogonal frequency division multiplexing (OFDM) scheme and may use time and frequency (subcarrier) as radio resources.

The MAC layer which belongs to the second layer provides a service to a radio link control (RLC) layer, which is the upper layer of the MAC layer, via a logical channel.

The RLC layer which belongs to the second layer supports reliable data transfer. The RLC layer supports 3 transmission modes, Transparent Mode (TM), Unacknowledged Mode (UM) and Acknowledged Mode (AM). AM of RLC layer provides bidirectional data transmission service and supports retransmission of RLC Protocol Data Unit (PDU).

A packet data convergence protocol (PDCP) layer which belongs to the second layer performs header compression function. When transmitting an Internet Protocol (IP) packet such as an IPv4 packet or an IPv6 packet, the header of the IP packet may contain relatively large and unnecessary control information. The PDCP layer reduces the header size of the IP packet so as to efficiently transmit the IP packet.

The radio resource control (RRC) layer which belongs to the third layer is defined only on the control plane. The RRC layer serves to control the logical channel, the transport channel and the physical channel in association with configuration, reconfiguration and release of a radio bearer (RB). The RB is a service provided by the second layer for data transmission between the user equipment and the E-UTRAN. If an RCC connection is established between the RCC of the user equipment and the RCC of the network, the user equipment is in an RCC connection mode, and otherwise, the user equipment is in an RCC idle mode.

A NAS layer which belongs to the upper layer of the RCC layer performs authentication, SAE bearer management, security control, and the like.

A header compression technique performed in the PDCP layer is described below.

A large part of IP header of IP packet belonging to the same packet stream is not changed. Non-variable fields of the IP header are stored in the form of context in a compressor of a transmitter and a decompressor of a receiver. The transmitter transmits only variable fields after the context is formed. The header compression technique can reduce overhead caused by transmission of full header of the IP packet all the time. The compressor and the decompressor can be located in a PDCP layer.

Figure 5:
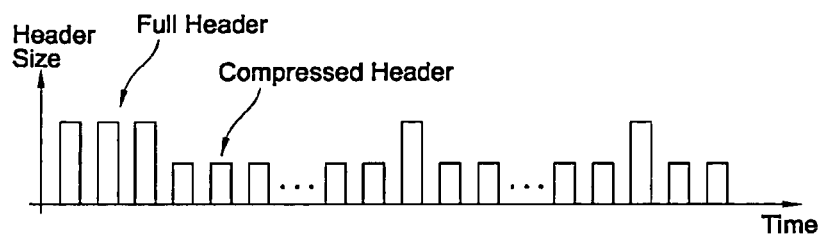
FIG. 5 illustrates transmission of full header packets and compressed header packets when a header compression technique is used.

FIG. 5 illustrates transmission of full header packets and compressed header packets when the header compression technique is used.

Referring to FIG. 5, at the initial stage of header compression, a compressor transmits full header packets in order to form a context for a corresponding packet stream in a decompressor. There is no gain caused by header compression when the full header is transmitted. But when the compressor transmits only compressed header packets after the context is formed in the decompressor, the gain becomes noticeable.

The compressor determines which packet is transmitted as a full header packet and which packet is transmitted. In general, full header packets are transmitted to form a context and compressed header packets are transmitted after forming the context. The full header packets are transmitted from time to time after forming the context to synchronize the context of the decompressor with the context of the compressor.

When a compressor of a transmitter receives an IP packet from an upper layer, the compressor composes the IP packet of a full header or a compressed header according to the pattern of the header of the IP packet. Then, the transmitter transmits the IP packet composed of the full header or the compressed header to a receiver. That is, the compressor transmits the IP packet as a full header packet when the compressor determines that the context is formed or the existing context is updated. The compressor transmits the packet as a compressed header packet when the compressor determines that the context is fully formed in the decompressor of the receiver.

A decompressor of a receiver must receive full header packets for a packet stream to form a context because the context becomes a basis of decompression of compressed headers packets. If the decompressor receives compressed header packets when the context is not formed yet, the decompressor cannot decompress the original headers of the packet stream. As a result, the received packets are discarded.

When header compression technique is used for a PS service, a PDCP layer of a transmitter transmits IP packets having the same QoS, which are received as a single stream from an upper layer, in the form of one of "packets forming or updating a context" and "packets that do not form or update a context". However, when "packets forming or updating a context" are not successfully transmitted to the receiver, all "packets that do not form or update a context" transmitted after "packets forming or updating a context" are not decompressed in a receiver and discarded. Accordingly, "packets forming or updating a context" are much more important than "packets that do not form or update a context".

VoIP is a service that transmits voice data through Internet protocol (IP) and is based on PS domain. To effectively provide PS based voice service, RTP and RTCP are used. The RTP can solve a jitter problem because the RTP carries time stamp information in every packet and can report a loss of RTP packet through the RTCP to reduce FER through rate control. One of problems in support of VoIP in wireless communication is that packet properties of the RTP and RTCP are different from each other. The RTP is insensitive to error but sensitive to delay and jitter because it is real-time user data whereas the RTCP corresponding to control data is insensitive to delay and jitter but sensitive to error. Furthermore, while the RTP carries voice data so that small-size packets are frequently transmitted, the RTCP has large transmission capacity and a low transmission frequency compared to RTP and is irregularly transmitted because it is control data.

Radio resource allocation methods for VoIP include dynamic scheduling, persistent scheduling and semi-persistent scheduling.

Figure 6:
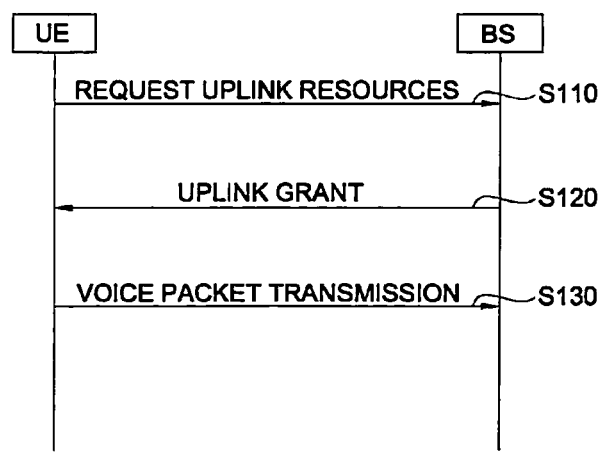
FIG. 6 is a flow chart showing a dynamic scheduling method.

FIG. 6 is a flow chart showing the dynamic scheduling method.

Referring to FIG. 6, a user equipment (UE) requests uplink radio resources to a base station (BS) in order to provide VoIP (S110). Since voice packets are transmitted in uplink direction, the UE requests the uplink radio resources to the BS to transmit the voice packets.

The BS allocates radio resources at the request of the UE (S120). Radio resource allocation can be performed through a physical downlink control channel (PDCCH). The UE transmits the voice packets through the allocated radio resources (S130).

By dynamic scheduling, radio resources are allocated only when the UE requests the radio resources. The UE should request radio resources whenever the UE has uplink data and the BS should allocate radio resources in response to the request of the UE. Overhead can be caused by frequent signaling.

By persistent scheduling, radio resources for voice packets are previously allocated. Flexibility of allocation of radio resources can be decreased.

By semi-persistent scheduling, radio resources to voice packets are previously allocates. Here, the BS and UE allocate the radio resources in agreement with each other when configuring a radio bearer (RB). When the UE requests VoIP service, the BS may allocate uplink radio resources or not. When the BS allocates uplink radio resources to the UE, the UE uses the uplink radio resources. On the contrary, when no radio resources are allocated, the UE uses previously set radio resources. The semi-persistent scheduling uses the fact that the RTP frequently transmits small-size packets in VoIP service. When VoIP service is initiated, the packet-size and period of RTP are previously determined and radio resources are persistently allocated. According to the semi-persistent scheduling, voice packets can be directly transmitted without performing the radio resource request and the radio resource allocation.

The semi-persistent scheduling can achieve effective radio resource allocation when packets having a specific size and periodicity such as VoIP service are transmitted. However, conventional semi-persistent scheduling cannot appropriately cope with variable packet size because it previously estimates the packet size and allocates radio resources.

Figure 7:
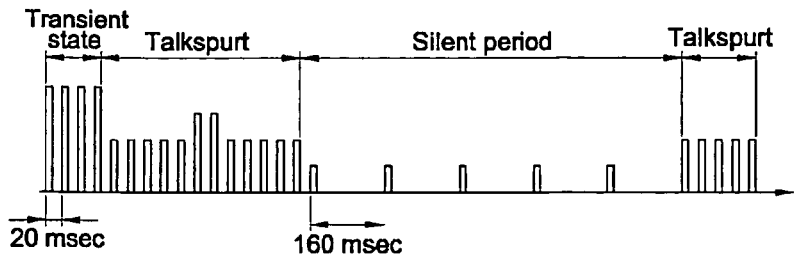
FIG. 7 illustrates a traffic model in VoIP.

FIG. 7 illustrates a traffic model in VoIP.

Referring to FIG. 7, voice packets generated in VoIP can be divided into packets generated in a talkspurt and packets generated in a silent period. At 12.2 kbps adaptive multi-rate (AMR), for example, RTP packet is generated in a cycle of 20 ms and has a size of 35 through 49 bytes in the talkspurt. RTP packet is generated in a cycle of 160 ms and has a size of 10 through 24 bytes in the silent period. It is difficult to estimate the start and end of the talkspurt because they are irregular.

When a UE and a BS negotiate with each other on semi-persistent scheduling in RB configuration stage of VoIP service, if radio resources are previously allocated on the basis of the packets generated in the talkspurt, the radio resources are wasted in the silent period.

To solve this problem, the UE reports change of a pattern of generating voice packets to the BS through a control message when the VoIP service is provided along with semi-persistent scheduling.

Figure 8:
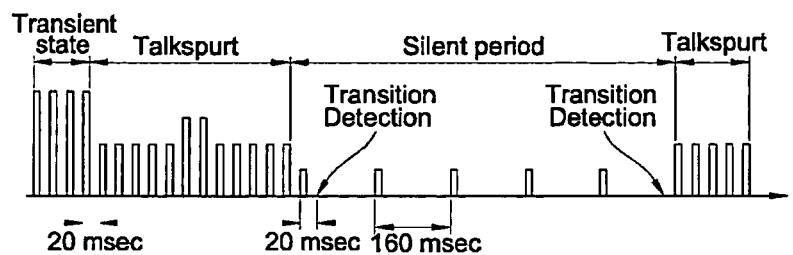
FIG. 8 illustrates an operation of determining a silent period and talkspurt in a traffic module of VoIP.

FIG. 8 illustrates an operation of determining a talkspurt and a silent period in a traffic model of VoIP.

Referring to FIG. 8, a pattern of a voice packet can be defined according to whether a RTP packet is generated in the talkspurt or in the silent period in the VoIP service. Voice packets are generated in different cycles in the talkspurt and the silent period. For example, the RTP packet is generated in a cycle of 20 ms in the talkspurt and generated in a cycle of 160 ms in the silent period. When the cycle of generating the RTP packet is changed from 20 ms to 160 ms, the UE can detect transition of the pattern of generating the packet. Furthermore, when the cycle of generating the RTP packet is changed from 160 ms to 20 ms, the UE can detect transition of the pattern of generating the packet.

The UE can detect the transition of the voice packet pattern through the various methods. Radio resource scheduling is usually performed in a MAC layer. On the contrary, voice packets are generated in an upper layer of the PDCP layer. Thus, scheduling can be performed only when the MAC layer recognizes change of the pattern of generating voice packets.

In an embodiment, a PDCP layer can compare time stamp values included in RTP packets to detect transition. Since the time stamp values represent sampling points of the RTP packets, the PDCP layer determines whether the packet generating cycle is 20 ms or 160 ms. If a distance between the time stamp value of a previous voice packet and the time stamp value of a current voice packet is changed from 20 ms to 160 ms or changed from 160 ms to 20 ms, the PDCP layer reports detection of transition to a MAC layer.

In another embodiment, an upper layer in which voice packets are generated provides information on change of the pattern of generating voice packets to a lower layer, that is, a RRC layer, a PDCP layer, a RLC layer or a MAC layer. For example, RTP protocol notifies the PDCP layer of the information on the change of the pattern generating voice packets, and the PDCP layer delivers the information to the MAC layer.

In still another embodiment, transition is detected using buffer state of a PDCP layer, a RLC layer or MAC layer and a timer. In talkspurt, RTP packets are generated in the cycle of 20 ms and stored in a buffer. When the RTP packets are successfully transmitted, the RTP packets are discarded from the buffer. Since voice packets are generated in the cycle of 20 ms in the talkspurt, data is stored in the buffer in the cycle of 20 ms. On the other hand, voice packets are generated in the cycle of 160 ms in the silent period and stored in the buffer in the cycle of 160 ms. That is, transition is detected by comparing the timer and buffer state. For example, if the buffer is empty for longer than 80 ms, it can be determined that voice packets are generated in the silent period. On the contrary, if the buffer is not empty for longer than 80 ms, it can be determined that voice packets are generated in the talkspurt. Information on the timer and the buffer can be previously transferred from the BS through an RRC message.

When a MAC layer of a UE determines transition from talkspurt to silent period or transition from the silent period to the talkspurt, the MAC layer notifies a network (for example, BS) of transition (for example, the start and end of the talkspurt) through a control message.

Information of detecting the transition can be transmitted using various methods. A transition indicator is control information that represents transition from talkspurt to silent period or from the silent period to the talkspurt.

In an embodiment, when voice data is transmitted through radio resources allocated by semi-persistent scheduling, a transition indicator is transmitted. The transition indicator corresponds to a MAC control element, RLC control element or PDCP control element.

More specifically, since radio resources are semi-persistently allocated in advance on the basis of transmission of packets generated in a talkspurt, voice data with the transition indicator are transmitted through the radio resources when transition from talkspurt to silent period is detected.

When there is no voice data to be transmitted, data composed of only the transition indicator can be transmitted to the BS.

Furthermore, when the UE transmits voice packets in a silent period, information that represents that current period corresponds to the silent period can be transmitted in the voice packets. For example, when voice packets of the silent period are transmitted in a cycle of 160 ms, a transition indicator is transmitted with the voice packets to represent that the current or future period corresponds to the silent period.

To implicitly notify change of the voice packet generating pattern, predetermined properties (for example, packet sizes) of packets of the talkspurt and the silent period can be used. The predetermined properties can be negotiated between a UE and a BS. If a packet size is used as the packet property, the BS previously defines a threshold for the packet size using an RRC message. A packet having a size greater than the threshold is regarded as a packet of the talkspurt and a packet having a size smaller than the threshold is regarded as a packet of the silent period.

In another embodiment, radio resources used to transmit a transition indicator can be independently allocated.

Figure 9:
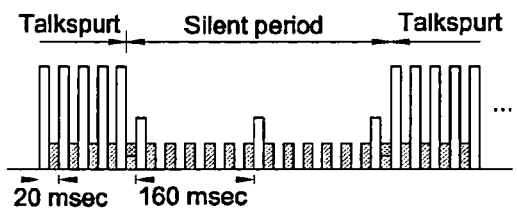
FIG. 9 illustrates allocation of independent resources to a transition indicator.

FIG. 9 illustrates allocation of independent resources to a transition indicator.

Referring to FIG. 9, radio resources used to transmit a transition indicator can be semi-persistently allocated when a RB is configured for VoIP service. A UE determines whether the pattern of generating packets is changed during the period of the radio resources allocated to transmit the transition indicator. When the UE determines that the pattern of generating packets is changed, the UE notifies the BS of the change of the packet generating pattern through the transition indicator. When the UE determines that the packet generating pattern is not changed during the period, the UE notifies a BS that the packet generating pattern is not changed through the transition indicator. Alternatively, when the transition indicator is not transmitted, the BS can judge that transition does not occur since no signal is detected from the resources for the transition indicator.

Radio resources for the transition indicator can be allocated to both talkspurt and silent period. For example, if the radio resources for the silent period are allocated, the UE can notify the BS whether the packet generating pattern is changed even in the silent period.

Although it shows that radio resources for the transition indicator are allocated in a cycle of 20 ms, the radio resources for the transition indicator can be allocated periodically or non-periodically. The UE can transmit the transition indicator only when the UE has spare radio resources. Furthermore, the UE can transmit the transition indicator only when transition occurs.

In still another embodiment, a transition indicator can be transmitted using an uplink control signal. Uplink control signals include a channel quality indicator (CQI) that measures and reports downlink channel information, a ACK/NACK signal that assists transmission of hybrid automatic repeat request (HARQ) data, a uplink reference signal used to measure an uplink channel, and a scheduling request signal for requesting uplink radio resources. When the CQI or the scheduling request signal is used, the transition indicator can be transmitted using single code point. When the ACK/NACK signal is used, the transition indicator can be transmitted through a NACK signal on the assumption that special HARQ operation in which only an ACK signal is transmitted and the NACK signal is not transmitted is performed in the transmission of voice data packets.

A transition indicator can variously be configured.

In an embodiment, a transition indicator can be configured using a trigger method. When both a UE and a BS know a voice packet pattern, the UE simply notifies the BS of transition from a specific pattern (for example, talkspurt) to another pattern (for example, silent period) in a trigger manner. In this case, the transition indicator can be configured in the form of 1-bit data. The BS can detect transition only through transmission/non-transmission of the transition indicator.

For example, when the BS knows that current voice packet is generated in the talkspurt, the BS can judge that transition from the talkspurt to the silent period occurs when the UE transmits the transition indicator to the BS. On the contrary, when the BS knows that current voice packet is generated in the silent period, the BS can judge that transition from the silent period to the talkspurt occurs when the UE transmits the transition indicator to the BS.

In another embodiment, voice packet patterns are indexed and an index of a voice packet pattern can be transmitted as a transition indicator. For example, when there are four voice packet patterns, the four patterns can be indexed as two-bit information, that is, '00', '01', '10' and '11'. If the third pattern is changed, the UE transmits '10' as the transition indicator. The BS can notify the UE of information on the indexes of voice packet patterns through an RRC message when a RB is configured for VoIP service. Otherwise, the UE can be notified of the information on indexes of voice packet patterns through a common control channel such as system information.

In still another embodiment, mixture of the trigger method and the indexing method can be used. A BS can inform a UE of information on which method is used. Furthermore, the UE can use the trigger method or the indexing method according to specific criteria For example, the UE can use the indexing method once according to the number of transmissions and then use the trigger method N times. Alternatively, the UE can use the indexing method during a predetermined period of time and use the trigger method in other time periods. Information on the criteria can be transmitted from the BS through an RRC message. The RRC message can be a signal with respect to RB configuration or system information.

When a BS receives a transition indicator and determines that voice packet pattern is changed, the BS can transmit a pattern change confirmation message (or transition indication confirmation message) to a UE. The packet change confirmation message can improve reliability of transmitting the transition indicator. When the transition indicator transmitted from the UE has error or is lost, the VoIP service can be deteriorated because information on the voice packet pattern known to the UE is different from information on the voice packet pattern known to the BS.

When a UE does not receive pattern change confirmation message from a BS after transmitting a transition indicator, the UE can re-transmit the transition indicator to the BS. When the UE does not receive the pattern change confirmation message after transmitting the transition indicator, the UE can transmit the transition indicator one more time. The UE can continuously re-transmit the transition indicator until the UE receives the pattern change confirmation message.

A pattern change confirmation message can be received in a predetermined period of time after a UE transmits a transition indicator. The UE can re-transmit the transition indicator if the UE cannot receive the pattern change confirmation message in the predetermined period of time.

Figure 10:
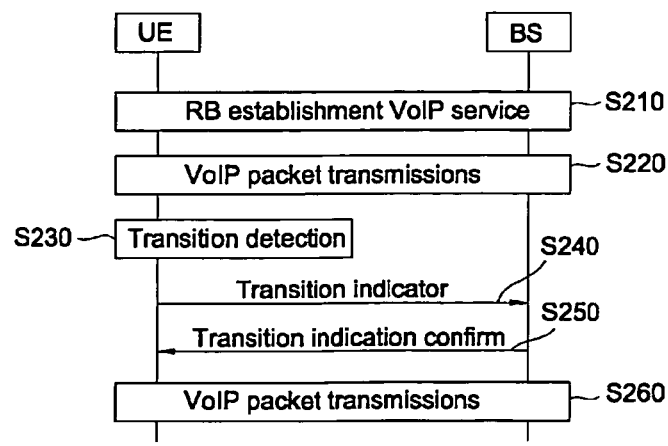
FIG. 10 is a flow chart showing a pattern changing method according to an embodiment of the present invention.

FIG. 10 is a flow chart showing a pattern changing method according to an embodiment of the present invention.

Referring to FIG. 10, an RB for providing VoIP service is configured between a BS and a UE (S210). Information on allocating radio resources to transmit voice packets according to semi-persistent scheduling is exchanged. Furthermore, information on allocating radio resources used to transmit a transition indicator, information on transmitting the transition indicator, configuration of the transition indicator, and information on a transition indication confirmation message can be set.

The UE and BS transmit and receive voice packets according to the RB configuration (S220).

The UE performs transition detection according to a change of voice packet generating pattern (S230). For example, a MAC layer of the UE can receive information on transition from talkspurt to silent period or transition from silent period to talkspurt from an upper layer (for example, PDCP layer).

The UE transmits a transition indicator (S240).

The BS receives the transition indicator, and then transmits a transition indication confirmation message to the UE (S250). The UE can re-transmit the transition indicator to the BS when the UE does not receive the transition indication confirmation message from the BS.

The UE and BS transmit and receive voice packets (S260).

When the packet generating pattern is changed and information on the change of the packet generating pattern is delivered to the BS, the UE transmits the voice packets using the semi-persistent radio resources which are allocated during RB configuration. For example, the BS configures semi-persistent radio resource allocation information A and semi-persistent radio resource allocation information B to the UE at the RB configuration. The UE uses the radio resource allocation information A in talkspurt and the radio resource allocation information B in silent period.

By transmitting a transition indicator, radio resources for the transmission of voice packets such as VoIP can effectively be. In particular, along with semi-persistent scheduling, generation of unnecessary control signal and waste of radio resources can be decreased to improve system performance.

The functions described in connection with the embodiments disclosed herein may be performed by implemented by hardware, software or a combination thereof. The hardware may be implemented by a microprocessor, a controller, an application specific integrated circuit (ASIC) and a processor. Design, development and implementation of the software are well known to those skilled in the art based on the detailed description.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method for transmitting data using real-time transport protocol (RTP) packets based on semi-persistent scheduling, the method comprising:
   allocating radio resources used for talkspurt and radio resources used for silent period, wherein the takspurt radio resources used for the RTP packets generated during the talkspurt are allocated in a cycle of a first period, the silent period radio resources used for the RTP packets generated during the silent period are allocated in a cycle of a second period which is a multiple of the first period;
   allocating radio resources used for a transition indicator that indicates a transition from the talkspurt to the silent period or transition from the silent period to the talkspurt, wherein the radio resources used for the transition indicator are allocated in a cycle of the first period;
   detecting transition from the talkspurt to the silent period or transition from the silent period to the talkspurt by comparing time stamp values included in the RTP packets, wherein the time stamp values represent sampling points of the RTP packets, a time stamp value for the silent period is greater than a time stamp value for the talkspurt, and the detection is performed by a packet data convergence protocol (PDCP) layer; and
   transmitting the transition indicator based on the radio resources used for the transition indicator.

2. The method according to claim 1, further comprising:
   receiving a transition indication confirmation message, in response to the transition indicator, in a downlink direction.

3. The method according to claim 2, further comprising:
   re-transmitting the transition indicator when the transition indication confirmation message is not received for a predetermined period of time.

4. The method according to claim 1, wherein detecting the transition is performed in such a manner that an upper layer notifies a medium access control (MAC) layer of the transition from the talkspurt to the silent period or transition from the silent period to the talkspurt.

5. The method according to claim 4, wherein the upper layer is the packet data convergence protocol (PDCP) layer.

6. The method according to claim 1, wherein the transition indicator including a detection result is transmitted through the radio resources used for the transition indicator, wherein voice packets are transmitted using different radio resources in the talkspurt and the silent period according to the transition indicator.

7. The method according to claim 6, wherein the transition indicator is trigger information that indicates transition from the talkspurt to the silent period or transition from the silent period to the talkspurt.

8. The method according to claim 6, wherein the transition indicator is index information of a transition pattern of the voice packet.

* * * * *